United States Patent Office 2,976,300
Patented Mar. 21, 1961

2,976,300

METHOD OF PREPARING METHYL 5-NITRO-2-FURYL KETONE

Kenyon J. Hayes and Julian G. Michels, Norwich, N.Y., assignors to The Norwich Pharmacal Company, Norwich, N.Y., a corporation of New York No Drawing. Filed Feb. 20, 1959, Ser. No. 794,497

3 Claims. (Cl. 260—347.8)

This invention relates to the nitration of a furan compound and is particularly concerned with the provision of an improved process for preparing methyl 5-nitro-2-furyl ketone. This compound is useful in very dilute concentrations in the prevention of mold growth (Japanese Patent No. 7,799; September 17, 1957).

Prior to our invention, the best known method of nitrating furan compounds was that described in Kimel et al. U.S. Patent No. 2,490,006. According to the Kimel et al. patent, a nitration intermediate was prepared by treating the furan compound with acetic anhydride and concentrated nitric acid. The nitration intermediate was then converted into the nitrofuran by adding to the nitration mixture an aqueous solution of a base that forms a buffer system in the presence of acetic acid. In the preparation of methyl 5-nitro-2-furyl ketone by the Kimel et al. method, the yield of the desired end product is in the neighborhood of 18%.

We have discovered that it is possible to secure methyl 5-nitro-2-furyl ketone in yields of 45–60% by treating a nitration intermediate, which can be prepared through the addition of methyl furyl ketone to a nitrating mixture of acetic anhydride and nitric acid, with a salt of a strong base under anhydrous conditions. The practice of our conversion step is easy since it is merely necessary to add the anhydrous base to the nitration mixture containing the nitration intermediate.

In the practice of our process we prefer to employ concentrated nitric acid. Also, the addition of a small amount of strong acid to the nitrating mixture is desirable.

According to our invention, a nitrating mixture consisting of concentrated nitric acid and acetic anhyride and containing a very small amount of a strong acid, such as sulfuric, to serve as a catalyst, is prepared and methyl furyl ketone, preferably dissolved in acetic anhydride, is added thereto in known fashion. The nitration mixture is treated with a salt of a strong base such as potassium acetate under anhydrous conditions. Thereafter, the reaction mixture is quenched, for instance, by pouring on ice, the solution is stirred and the crystals of methyl 5-nitro-2-furyl ketone which precipitate are filtered. The filtrate is extracted with an organic solvent such as chloroform to secure a further quantity of the product or, alternatively, a carbonyl precipitating agent such as semi-carbazide hydrochloride can be added thereto to obtain the product in the form of a readily isolable derivative thereof.

In order that our invention may be readily available to, and understood by, those skilled in the art, it is briefly described in the following specific examples:

*Example I*

A nitrating mixture is prepared by adding 0.66 mole (41.8 cc.) of concentrated nitric acid (70%) plus 10 drops of concentrated sulfuric acid with stirring and cooling to 1.8 moles (185 cc.) of acetic anhydride over a period of 12 minutes at 20–25° C.

To this nitrating mixture 0.3 mole (33 g.) of methyl 2-furyl ketone dissolved in 25 cc. of acetic anhydride is added with stirring and cooling over a period of 13 minutes at 15–18° C. and this temperature is held for 10 minutes.

There is added to this mixture with stirring and cooling 0.9 mol of anhydrous potassium acetate (87 gm.). The potassium acetate is added in portions to keep the temperature below 35° C. (10 minutes addition). After stirring at 30° C. for 20 minutes, the mixture is heated to 65° C. in a warm water bath. After holding for 12 minutes at 60–65° C., it is cooled to 30° C. and poured into 500 cc. of ice and water with stirring. Crystals form. After stirring one hour the solid is filtered, washed with cold water (40° C.) and air-dried to constant weight—9.9 gm.; M.P. 70–78° C.

The filtrate and water washings are treated with semicarbazide hydrochloride. A voluminous precipitate results. This is filtered and the filtrate treated with more semicarbazide hydrochloride.

Additional semicarbazone is precipitated. This is collected and washed.

The two crops of semicarbazone are dried at 110° C.:

1st crop: 9.3 g., M.P. 245–255° C. (dec.)
2nd crop: 18.0 g., M.P. 248° C. (dec.)

The melting point of methyl 5-nitro-2-furyl ketone semicarbazone is 248° C. (dec.).

The first crop of semicarbazone is dissolved in 200 cc. of hot dimethylformamide, treated with charcoal, filtered hot and diluted with 3 volumes of water. A yellow precipitate crystallizes. This is collected and dried at 110° C.

1st crops semicarbazone (recrystallized)=6.3 g.; M.P. 248° C. (dec.).

The yield of methyl 5-nitro-2-furyl ketone semicarbazone is 24.3 g., equivalent to 17.75 g. of methyl 5-nitro-2-furyl ketone.

The yield of ketone is 27.65 g. (59.5%).

*Example II*

To 135 cc. of acetic anhydride is added during 15 minutes at 15–25° C. 45 cc. of 70% nitric acid plus 10 drops of sulfuric acid.

To the nitrating mixture is added during 10 minutes at 15–20° C. 33 g. of methyl furyl ketone in 50 cc. of acetic anhydride.

The mixture is stirred at 15–20° C. for 12 minutes. Then anhydrous potassium acetate (87 g.) is added with cooling, keeping the temperature at 35° C. The temperature is maintained at 35° C. for 1 hour then at 40–45° C. for 2¼ hours.

The solution is poured into 500 g. of ice plus 250 cc. of water and stirred for 1 hour. Then crystals are collected and washed well with water. These are recrystallized from 100 cc. of isopropanol and air-dried for 36 hours (10.2 g.; M.P. 78–79° C.).

The filtrate is extracted three times with 125 cc. portions of chloroform. The combined extracts are evaporated using a rotary vacuum vaporizer at the water pump on a steam bath and the residue recrystallized using the mother liquor (isopropanol) from the first crop. Crystals (9.3 g.; M.P. 77–78° C.) are obtained.

The reaction filtrate is extracted again with 300 cc. of chloroform, this is combined with the recrystallization filtrate and evaporated at the water pump on the steam bath. To the residue is added 50 cc. of fresh isopropanol and it solidifies. It is filtered and the solid treated with ether. The ether is evaporated yielding a third crop (1.4 g.; M.P. 70–74° C.).

The yield of methyl 5-nitro-2-furyl ketone is 20.9 g. (45%).

Example III

Proceeding as in the above examples but substituting sodium acetate for potassium acetate, similar results are obtained.

What is claimed is:

1. In the process of nitrating methyl 2-furyl ketone to produce methyl 5-nitro-2-furyl ketone wherein said methyl 2-furyl ketone is treated with a nitrating mixture comprising acetic anhydride and nitric acid to form a nitration intermediate, the step of converting said nitration intermediate into methyl 5-nitro-2-furyl ketone which comprises treating said nitration intermediate with a salt of a strong base selected from the group consisting of potassium acetate and sodium acetate under anhydrous conditions.

2. The process of claim 1 in which the salt is potassium acetate.

3. The process of claim 1 in which the salt is sodium acetate.

References Cited in the file of this patent

UNITED STATES PATENTS

| | | |
|---|---|---|
| 2,490,006 | Kimel | Nov. 29, 1949 |
| 2,502,114 | Witte | Mar. 28, 1950 |

FOREIGN PATENTS

| | | |
|---|---|---|
| 797,961 | Great Britain | July 9, 1958 |

OTHER REFERENCES

Dunlop: The Furans, A.C.S. Monograph No. 119 (1953), (Reinhold Publishing Corp.), pp. 141–148.